(12) United States Patent
Lin et al.

(10) Patent No.: US 7,218,794 B2
(45) Date of Patent: May 15, 2007

(54) METHOD FOR DETECTING GRID IN BLOCK-BASED COMPRESSED VIDEO

(75) Inventors: Peng Lin, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 751 days.

(21) Appl. No.: 10/412,030

(22) Filed: Apr. 10, 2003

(65) Prior Publication Data

US 2003/0169375 A1    Sep. 11, 2003

(51) Int. Cl.
*G06K 9/40* (2006.01)
*H04B 1/66* (2006.01)
(52) U.S. Cl. ............ 382/268; 382/275; 375/240.29
(58) Field of Classification Search .......... 382/233, 382/268, 264, 266, 275; 375/240.24, 240.29
See application file for complete search history.

(56) References Cited

U.S. PATENT DOCUMENTS

| 5,555,028 | A | 9/1996 | Kim | 348/607 |
| 6,427,031 | B1 | 7/2002 | Price | 382/264 |
| 6,496,605 | B1 * | 12/2002 | Osa | 382/268 |
| 6,728,414 | B1 | 4/2004 | Chang | 382/254 |
| 6,738,528 | B1 | 5/2004 | Nio | 382/268 |
| 6,950,562 | B2 | 9/2005 | Rouvellou | 382/264 |

* cited by examiner

*Primary Examiner*—Vikkham Bali
*Assistant Examiner*—Colin LaRose
(74) *Attorney, Agent, or Firm*—Michael Zarrabian, Esq.; Kenneth L. Sherman, Esq.; Myers Dawes Andras & Sherman, LLP (57) ABSTRACT

A grid detector detects the existence and the location of grids in DCT compressed videos. When a grid is detected in the input video, a post-processor is turned on and the de-blocking processing is applied on the grid detected by the grid detector. When no grid is detected, indicating that the input video is either an uncompressed video or an already de-blocked video, post-processing turned off to avoid degrading the picture quality. To detect grids, the grid detector: (a) computes horizontal and vertical second derivatives for all pixels of the image; (b) generates horizontal second derivative zero-crossing mask and vertical second derivative zero-crossing mask by marking the those pixels whose second derivatives have opposite signs with respect to their horizontal or vertical neighboring pixels'; (c) applies horizontal and vertical integral projections to the horizontal and vertical zero-crossing masks respectively; (d) generates the local maximum masks by locating the local maximum of the two projected 1-D signals; and (e) determines grid location by computing the positions of the local maximum masks.

28 Claims, 6 Drawing Sheets

METHOD FOR DETECTING GRID IN BLOCK-BASED COMPRESSED VIDEO

FIELD OF THE INVENTION

The present invention relates generally to video signal processing, and more particularly to detecting block grid in block-based compressed video for post-processing.

BACKGROUND OF THE INVENTION

Due to simplicity and efficiency, Discrete Cosine Transform (DCT) based compression techniques are dominant in video compression. Many popular video compression standards, such as MPEG-2, MPEG-4 and H.261, employ DCT techniques. The basic approach of a DCT based compression technique is to subdivide the image into 8×8 blocks and then individually transform, quantize, and encode each block. However, this block-based encoding technique introduces blocking artifacts between block boundaries because the DCT does not take the correlation between block boundaries into account. The blocking artifacts are typically the most noticeable picture degradation in DCT based coding systems.

Many post-processing algorithms have been proposed to remove the blocking artifacts of DCT-based compressed videos. Typically, such de-blocking algorithms need the precise location of the 8×8 grid because the de-blocking processes are applied near the grid where the blocking artifacts appear. De-blocking algorithms are designed for a fixed grid, assuming the grid location is known. However, in practice, grid positions can shift due to signal handling procedures, such as digital-analogue conversions and video signal transmission. Thus, when de-blocking algorithms are applied in real-life applications, such as TV, not only the blocking artifacts cannot be properly removed, but also other artifacts can be introduced if the algorithms' designated grid location does not match the input video's actual grid location. As such, without the precise grid location being provided, conventional post-processing algorithms are ineffective in practice.

There is, therefore, a need for a grid detection method and system to control the post-processing for de-blocking. There is also a need for such grid detecting method and apparatus to be capable of accurately detecting whether there is a grid in the input video and computing the precise location of the detected grid.

BRIEF SUMMARY OF THE INVENTION

The present invention addresses the above needs. An object of the present invention is to provide a reliable grid detection method that can accurately detect the existence and the location of the grid in DCT compressed videos. To achieve that goal, in one embodiment the present invention provides a grid detection method and system to control the post-processing. The grid detecting method accurately detects whether there is a grid in the input video and compute the precise location of the grid if it exists. When a grid is detected in the input video, a post-processor is turned on and the de-blocking processing is applied on the grid detected by the grid detector. When no grid is detected, indicating that the input video is either an uncompressed video or an already de-blocked video, post-processing turned off to avoid degrading the picture quality.

In an embodiment, the grid detection method includes the steps of: computing horizontal and vertical second derivatives for all pixels of the input image; generating a horizontal second derivative zero-crossing mask and a vertical second derivative zero-crossing mask, by marking those pixels whose second derivatives have opposite signs with respect to those of their horizontal or vertical neighboring pixels; applying horizontal and vertical integral projections to the horizontal and vertical zero-crossing masks to generate respective projected one dimensional (1D) signals, respectively; generating local maximum masks by locating the local maximum of the two projected 1D signals; and determining grid location by computing the positions of the local maximum masks.

Such a grid detection method accurately detects whether there is a grid in the input video and computes the precise location of the grid if it exists. The results of grid detection can be used to control post-processing for de-blocking.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 1A:
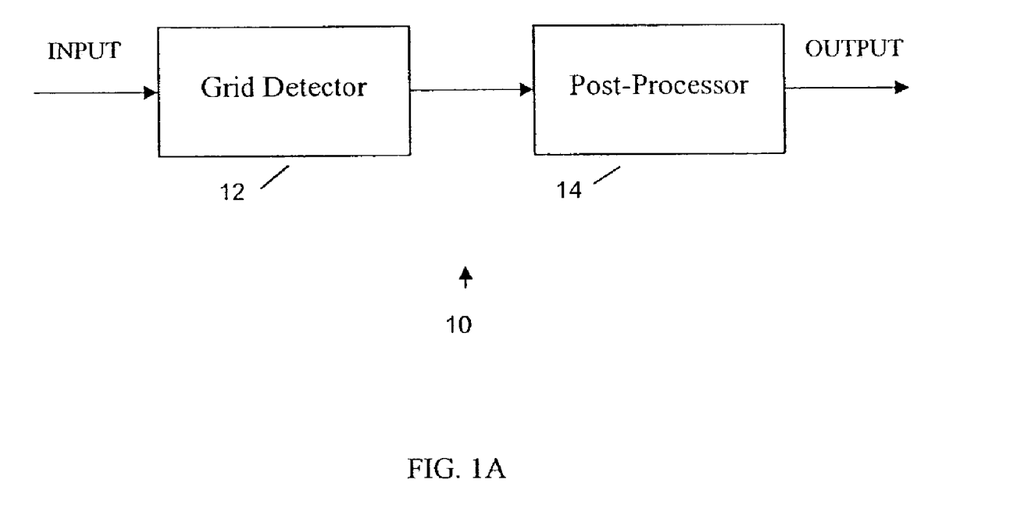
FIG. 1A shows an example application of a grid detection method according to the present invention.

As noted above, in one embodiment the present invention provides a grid detection method that can be used to control the post-processing for de-blocking. Referring to FIG. 1A, an example video processor 10 according to the present invention includes a grid detector 12 and a post-processor 14. The grid detector 12 detects if the input video includes a grid and computes the location of the grid if it exists. If a grid is detected, then the post-processor 14 is turned on and de-blocking is performed based on the grid location provided by the grid detector. If no grid is detected, indicating that the input video is either an uncompressed video or a de-blocked video, the post-processor 14 is turned off to avoid degrading the picture quality.

Figure 1B:
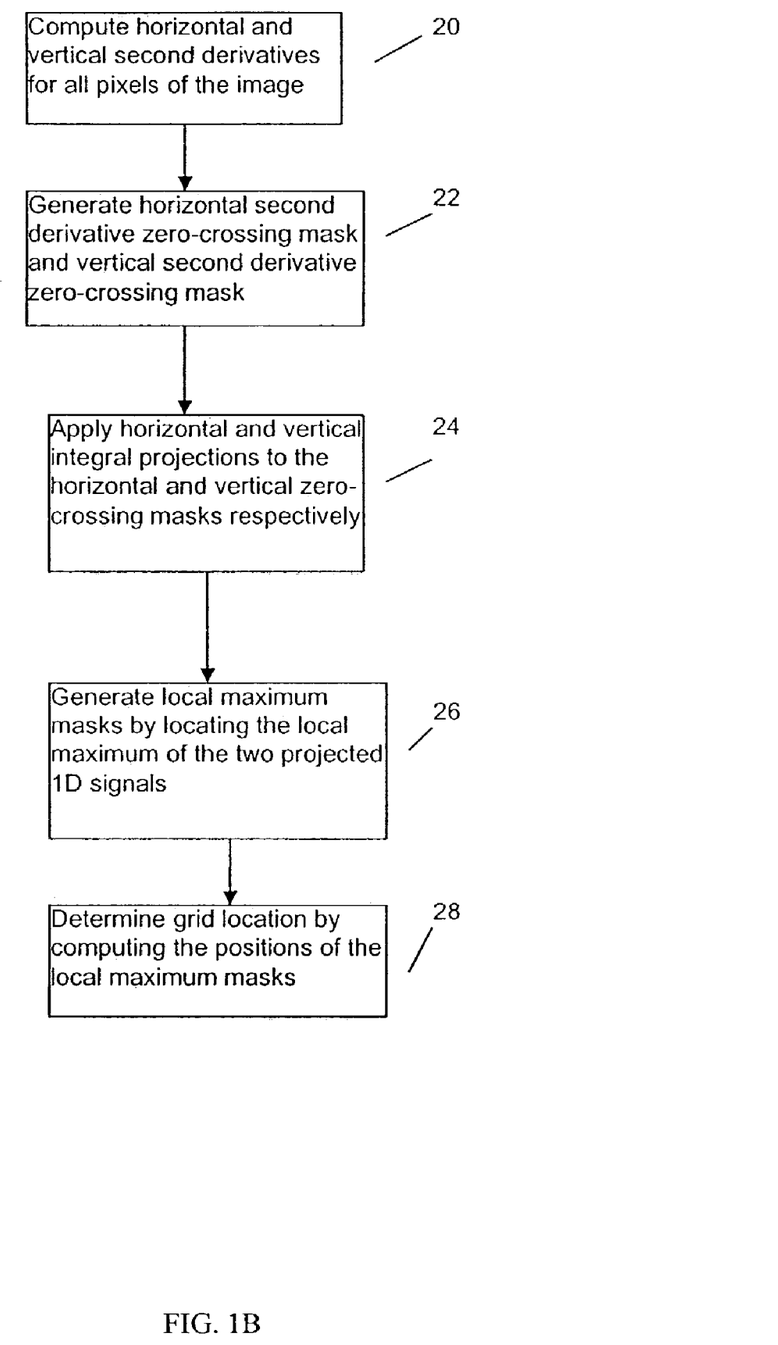
FIG. 1B shows a flowchart of the steps of embodiment of a grid detection method according to the present invention.

FIG. 1B shows a flowchart of the steps of the embodiment of a grid detection method implemented in the grid detector 12, according to the present invention. The grid detection method is for processing video signals representing video image frames comprising pixels, in order to detect the existence and the positions of a block grid in each frame resulting from block-based transform coding. The grid detection method comprises the steps of: computing horizontal and vertical second derivatives for all pixels of the input image (step 20); generating a horizontal second derivative zero-crossing mask and a vertical second derivative zero-crossing mask, by marking those pixels whose second derivatives have opposite signs with respect to those of their horizontal or vertical neighboring pixels (step 22); applying horizontal and vertical integral projections to the horizontal and vertical zero-crossing masks to generate respective projected one dimensional (1D) signals, respectively (step 24); generating local maximum masks by locating the local maximum of the two projected 1D signals (step 26); and determining grid location by computing the positions of the local maximum masks (step 28). Implementation details of the above steps are described by example further below.

Figure 2:
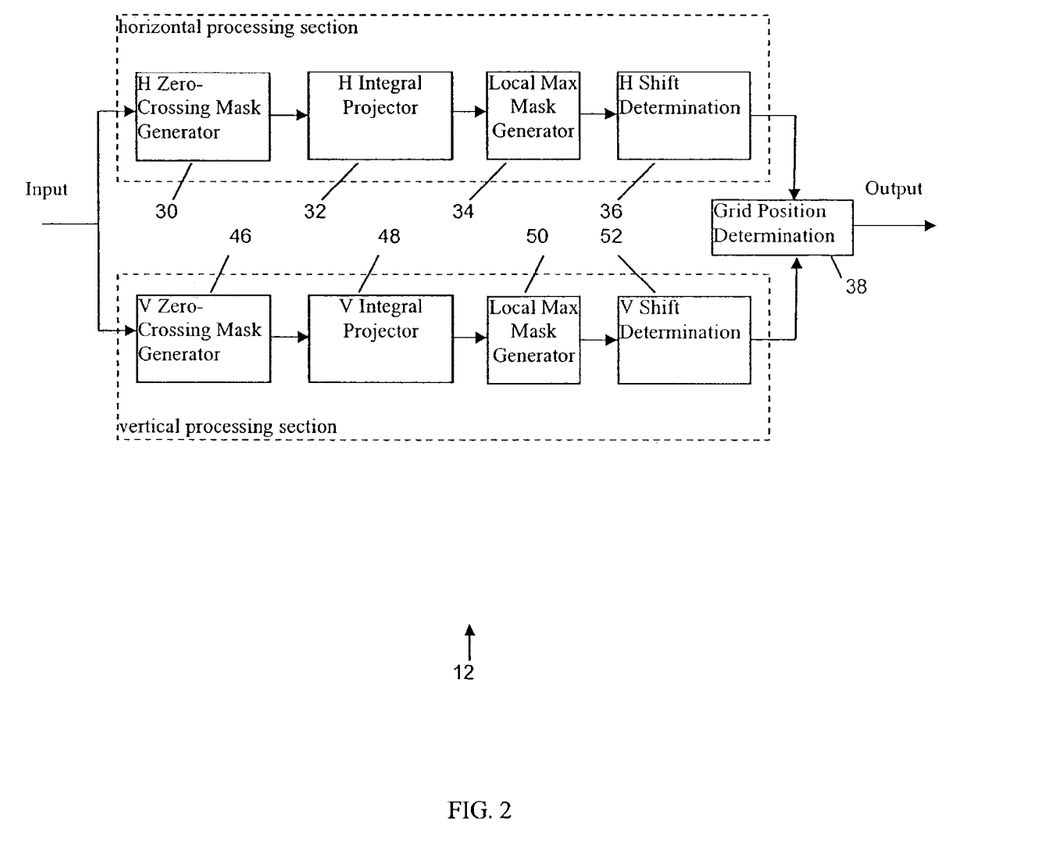
FIG. 2 shows a block diagram of an embodiment of a grid detection system according to the present invention.

FIG. 2 shows a block diagram of an example embodiment of the grid detector 12 according to the present invention. The grid detector 12 includes a horizontal processing section and a vertical processing section. The horizontal processing section generates the horizontal position of a detected grid, and the vertical processing section generates the vertical position of a detected grid. Horizontal processing and vertical processing are independent of each other, and as such, they can be performed in any order, or in parallel. In the following description, a detailed explanation of the horizontal processing section is provided. The vertical processing section is similar to the horizontal processing section.

To help understanding, the following notations are used through the description, wherein: M denotes the image height, N denotes the image width, f(m,n) denotes the gray value of pixel (m,n) in an image, where m and n are the row and column indices, respectively, with $0 \leq m < M$ and $0 \leq n < N$. Note that n represents the horizontal dimension of the image, and m represents the vertical dimension of the image frame. Further, for explanation purposes, and not limitation, a square grid block of dimensions (size) 8×8 pixels is used in the description herein. However, as those skilled in the art recognize, the present invention is useful with other grid block shapes and dimensions.

The horizontal processing section of the grid detector 12 includes a Horizontal Zero-Crossing Mask Generator 30, a Horizontal Integral Projector 32, a Local Maximum Mask generator 34, and a Horizontal Shift Determination block 36. The input video frame is first provided to a Horizontal (H) Zero-Crossing Mask generator 30 in the horizontal processing section. The H Zero-Crossing Mask generator 30 computes horizontal second derivatives for all pixels and marks the pixels that are the zero-crossing points of the horizontal second derivatives.

Figure 3:
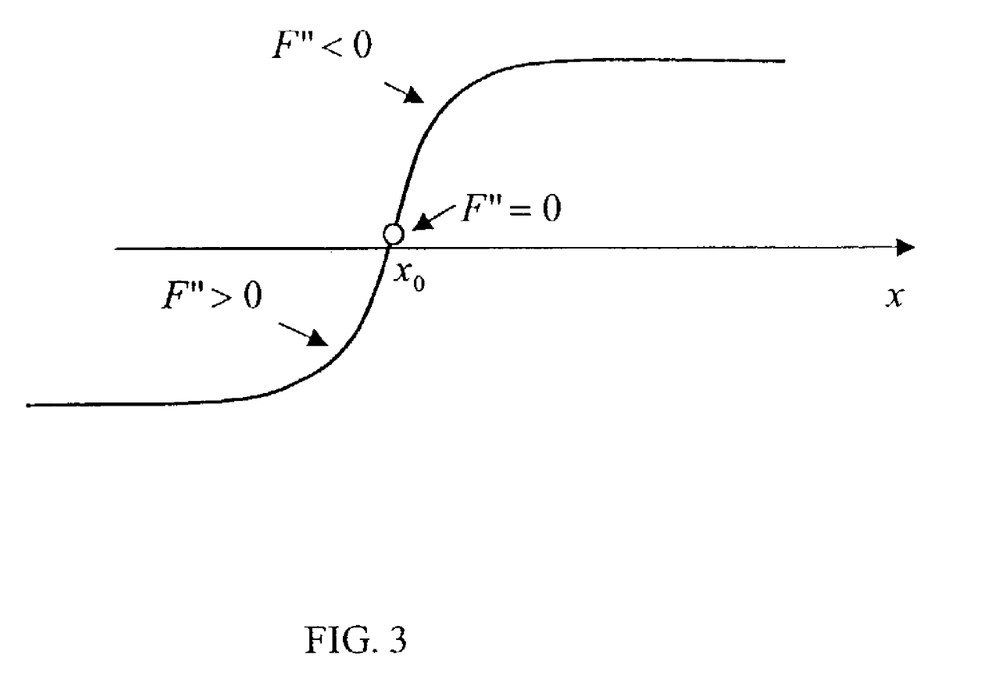
FIG. 3 shows a diagram illustrating an example zero-crossing point of a continuous function.

A zero-crossing point of a second derivative function can be explained by example as follows. For a continuous function F(x), a point $x_0$ is called a zero-crossing point of the second derivative F" if $F''(x_0)=0$ and F"(x) changes sign when x passes through the point $x_0$. FIG. 3 shows an example zero-crossing point $x_0$ of the continuous 1D function F(x) where $F''(x_0)=0$ and F"(x) changes sign when x passes through the point $x_0$.

Figure 4:
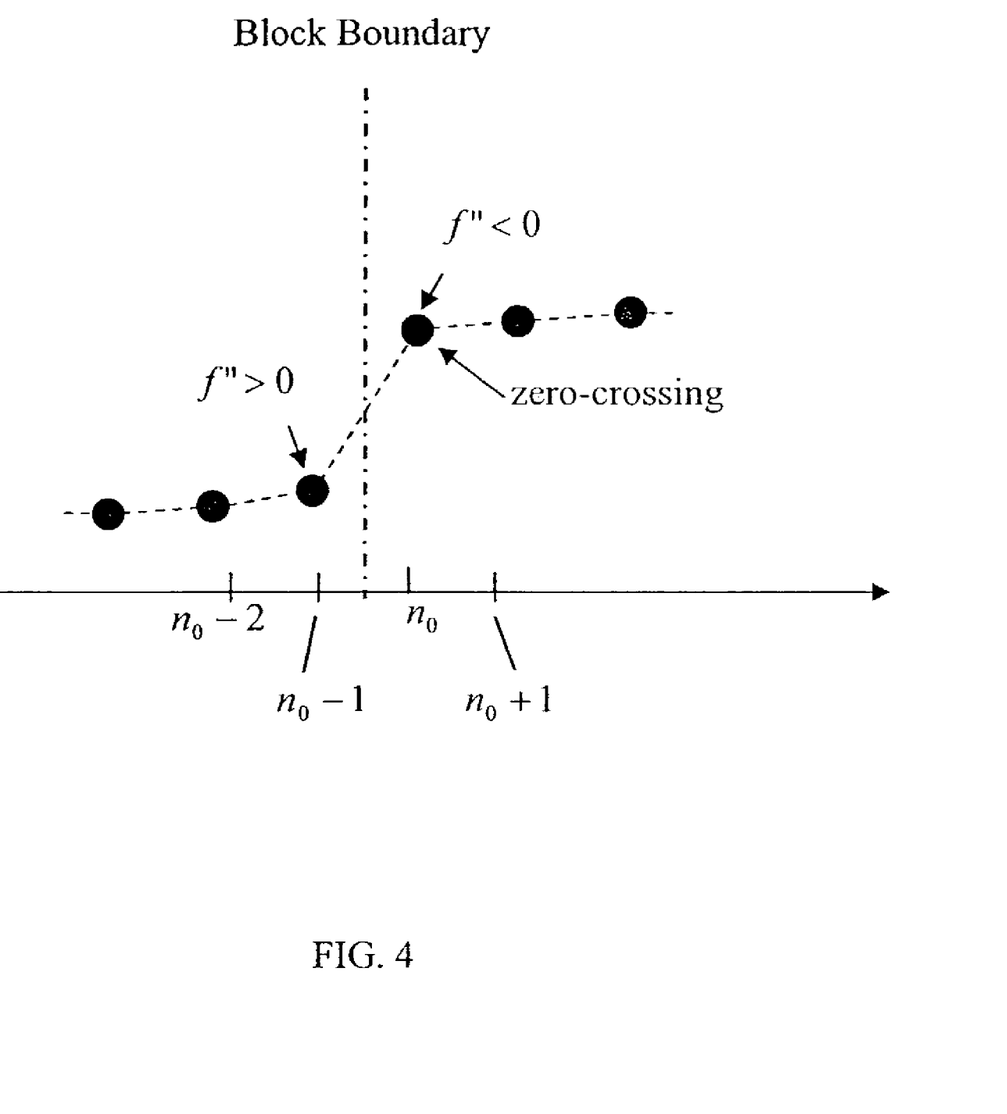
FIG. 4 shows a diagram illustrating an example zero-crossing at the block boundary in a DCT compressed image.

Due to the discrete nature of image representations as pixels, the definition of zero-crossing for a continuous function cannot be directly used for images. However, the definition of zero-crossing can be modified for digital images as follows. Referring to FIG. 4, an image pixel $(m_0, n_0)$ is a horizontal zero-crossing of the image f(m,n) if $f_h''(m_0, n_0)$ and $f_h''(m_0, n_0-1)$ have opposite signs, where $f_h''$ denotes the horizontal second derivative of f. According to the above definition of zero-crossing for an image, the block boundaries, or grid, of a DCT compressed image have higher chances of occurring at (or near) zero-crossing points. This is because for two adjacent blocks, pixel values within each block are close in value to each other, while there is a pixel value jump (i.e., change in relative pixel value) across the block boundary. As shown by example in FIG. 4, this situation usually causes zero-crossing of the second derivative (e.g., block boundary between horizontal pixel position $n_0-1$ and horizontal pixel position $n_0$, in the image frame).

Figure 5:
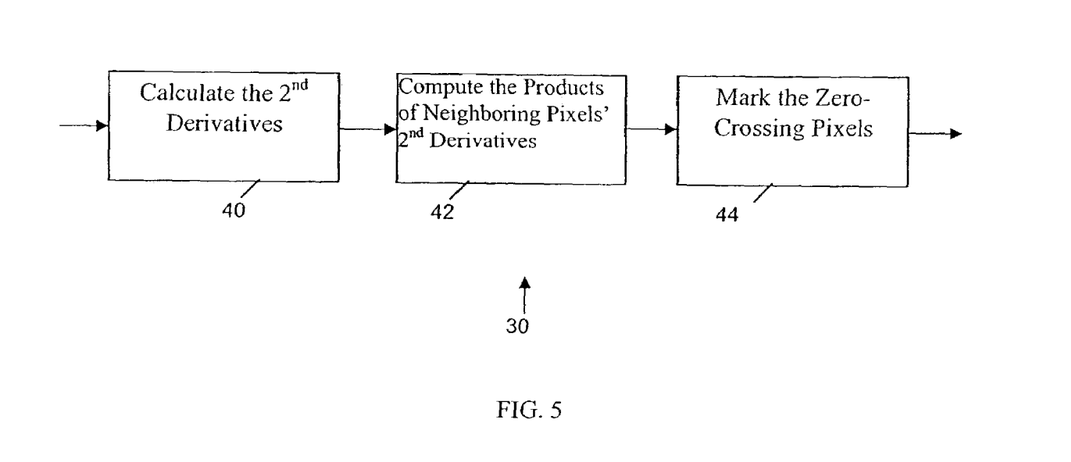
FIG. 5 shows a block diagram of an example H/V zero-crossing mask generator of FIG. 2, according to the present invention.

The block diagram in FIG. 5 shows an example implementation of an embodiment of the H Zero-Crossing Mask generator 30. In the H Zero-Crossing Mask generator 30, a second derivative calculation block 40 calculates the horizontal second derivative $f_h''$ for each pixel. The second derivative calculation block 40 can be implemented e.g. as a high-pass filter with coefficients (1, −2, 1). Then a compute block 42 computes the product $f_h''(m,n) \cdot f_h''(m,n-1)$. And, a marking block 44 determines if $f_h''(m,n) \cdot f_h''(m,n-1) < 0$, and if so, the image pixel at position (m,n) is marked as a zero-crossing pixel.

The H Zero-Crossing Mask generator 30 outputs a horizontal zero-crossing mask, $Z_h(m,n)$, wherein $Z_h(m,n)$ takes on value 1's at the zero-crossing pixels and 0's at non-zero-crossing pixels, wherein $Z_h(m,n)$ can be represented as:

$Z_h(m,n)=1$, if $f_h''(m,n) \cdot f_h''(m,n-1) < 0$; and $Z_h(m,n)=0$, otherwise.

Although the number 0 is used in the criteria for marking the zero-crossing pixels, negative numbers with small absolute values can also be used.

Referring back to FIG. 2, the horizontal zero-crossing mask $Z_h(m,n)$ is supplied to the H Integral Projector 32. The H Integral Projector 32 projects each vertical line of the mask $Z_h(m,n)$ onto the horizontal axis to produce a 1D signal, $P_h(n)$, that is a horizontal integral projection expressed as:

$$P_h(n) \sum_{m=1}^{M} Z_h(m,n).$$

The horizontal projection signal $P_h(n)$ is supplied to the Local Max Mask generator 34. If $X_h(n)$ denotes the horizontal local maximum mask, for each position n, the Local Max Mask generator 34 compares the value $P_h(n)$ with other values of $P_h$ in the interval centered at n with radius r e.g. 7 (i.e., [n−7, n+7]) to determine if it is the maximum (r is based on grid block size, wherein for an b×b grid block size r=b−1).

If $P_h(n)$ is the maximum within the example interval [n−7, n+7], then the position n is marked as a local maximum position, and the local maximum mask $X_h(n)$ is set to 1. Otherwise, $X_h(n)$ is set to 0. As indicated above, because the block grid positions have higher chance to be zero-crossing points, if a grid is detected, the local maximum mask $X_h(n)$ provides the detected grid's horizontal positions.

The horizontal local maximum mask $X_h(n)$ is then supplied to the H Shift Determination block 36 to determine the horizontal shift $\tau_h$ of the detected grid's horizontal position $X_h(n)$ from the standard grid's horizontal position. If S(m,n) denotes the standard grid, then S(m,n)=1 if either m or n can be divided by 8, and S(m,n)=0 otherwise. Though an 8×8 block of pixels is used for explanation herein, other block sizes and shapes can also be used.

Further, if $S_h(n)$ denotes the standard grid's horizontal position, then $S_h(n)=0$ if n can be divided by 8, and $S_h(n)=0$ otherwise. The H Shift Determination block 36 first computes the distances $d_h(i)$ between the horizontal local maximum mask $X_h(n)$ and the 8 possible shifted versions of the horizontal position of the standard grid $S_h(n)$ according to the example relation:

$$d_h(i) = \sum_{n=0}^{N} |X_h(n) - S_h(n-i)|, \quad \text{where } i = 0, 1, 2, 3, 4, 5, 6, 7.$$

Then H Shift Determination block 36 finds the smallest value among the eight $d_h(i)$'s. If $d_h(i_0)$ denotes the smallest distance, such that $d_h(i_0)<p\cdot N/8$, then the horizontal shift $\tau_h=i_0$, wherein p is a percentage threshold value used to determine if a grid exists. For example, p=20% can be used.

If $d_h(i_0) \geq p\cdot N/8$, then no grid is detected, and $\tau_h=-1$. The computed horizontal shift $\tau_h$, together with the vertical shift $\tau_v$, is provided the Grid Position Determination block 38, described further below.

As mentioned above, the vertical processing section is similar in function to the horizontal processing section, and it can operate independently. The vertical processing section generates the vertical shift $\tau_v$ of the detected grid position from the standard grid position.

Referring to the vertical processing section in FIG. 2, the input video frame is also supplied to a V Zero-Crossing Mask generator 46. Similar to the H Zero-Crossing Mask generator 30, the V Zero-Crossing Mask generator 46 generates the vertical zero-crossing mask $Z_v(m,n)$, which can be represented by relations:

$Z_v(m,n)=1$ if $f_v''(m,n)\cdot f_v''(m-1, n)<0$;

$Z_v(m,n)=0$ otherwise;

wherein $f_v''$ denotes the vertical second derivative, which can be calculated by using e.g. the high-pass filter (1, −2, 1), filtering along vertical direction. Once the vertical zero-crossing mask $Z_v(m,n)$ is generated, it is projected onto the vertical axis by a V Integral Projector 48, to produce a 1D signal $P_v(m)$ represented as:

$$P_v(m) = \sum_{n=1}^{N} Z_v(m, n).$$

The vertical projection signal $P_v(m)$ is supplied to a Local Max Mask generator 50 to generate the vertical local maximum mask $X_v(m)$. If $P_v(m)$ is the maximum within the e.g. interval [m−7, m+7], then the position m is marked as a local maximum position, and the local maximum mask $X_v(m)$ is set to 1. Otherwise, $X_v(m)$ is set to 0. The local maximum mask $X_v(m)$ provides the detected grid's vertical positions if the grid exists.

The vertical local maximum mask $X_v(m)$ is then provided to a V Shift Determination block 52 to determine the vertical shift $\tau_v$ of the detected grid's vertical position $X_v(m)$ from the standard grid's vertical position. If $S_v(m)$ denotes the standard grid's vertical position, then $S_v(m)=1$ if m can be divided by 8, and $S_v(m)=0$ otherwise. Similar to its counterpart in the horizontal processing section, the V Shift Determination block 52 first computes the distances $d_v(i)$ between the vertical local maximum mask $X_v(m)$ and the 8 possible shifted versions of the vertical position of the standard grid $S_v(m)$ according to the example relation:

$$d_v(i) = \sum_{m=0}^{M} |X_v(m) - S_v(m-i)|, \quad \text{where } i = 0, 1, 2, 3, 4, 5, 6,$$

Then V Shift Determination block 52 finds the smallest value among the eight $d_v(i)$'s. If $d_v(i_0)$ denotes the smallest distance, when $d_v(i_0)<p\cdot M/8$, then the vertical shift $\tau_v=i_0$, wherein p is a percentage threshold value used to determine if a grid exists. For example, p=20% can be used. If $d_v(i_0) \geq p\cdot M/8$, then no grid is detected, and $\tau_v=-1$.

In the final step of the grid detection, the Grid Position Determination block 38 uses the computed horizontal shift $\tau_h$ and vertical shift $\tau_v$, and determines the detected grid's position G(m,n). If either $\tau_h=-1$ or $\tau_v=-1$, then G(m,n)=0 for all $0 \leq m<M$ and $0 \leq n<N$, indicating that a grid is not detected. Otherwise, $G(m,n)=S(m-\tau_v, n-\tau_h)$, wherein $0 \leq m<M$ and $0 \leq n<N$. The detected grid position G(m,n) is the final output of the grid detection system.

Such a grid detector 12 according to the present invention accurately detects whether there is a grid in the input video and compute the precise location of the grid if it exists. The output of the grid detector 12 can be used to control post-processing for de-blocking as shown by example in FIG. 1A. The grid detector 12 detects grids in the input video and computes the location of detected grids, as described. If a grid is detected, then the post-processor 14 performs de-blocking based on the detected grid location provided by the grid detector 12. If no grid is detected, indicating that the input video is either an uncompressed video or a de-blocked video, the post-processor 14 is turned off to avoid degrading the picture quality.

The aforementioned apparatus/systems in FIGS. 1, 2 and 5, according to the present invention, can be implemented as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of processing video signals representing video image frames comprising pixels, to detect the existence and the positions of a block grid in each frame resulting from block-based transform coding, wherein the video signal value is a function f of pixel positions in each frame, comprising the steps of:

(i) computing a horizontal second derivative $f_h''$ and a vertical second derivative $f_v''$, for the function f at multiple pixel positions in a frame;

(ii) determining the zero-crossings of the second derivatives and generating horizontal and vertical second derivative zero-crossing masks;

(iii) computing a horizontal integral projection of the horizontal zero-crossing mask to generate a horizontal projected one dimensional signal, and computing a vertical integral projection of the vertical zero-crossing mask to generate a vertical projected one dimensional signal;

(iv) generating a local maximum mask for each of the two projected one dimensional signals; and (v) determining the grid block boundary position by computing the locations of the local maximum masks in the frame.

2. The method of claim 1, wherein the frame is substantially rectangular, having a vertical dimension and a horizontal dimension, such that steps (i) and (ii) are performed in the horizontal direction in the frame to detect the position of a vertical block boundary.

3. The method of claim 1, wherein the frame is substantially rectangular, having a vertical dimension and a horizontal dimension, such that steps (i) and (ii) are performed in the vertical direction in the frame to detect the position of a horizontal block boundary.

4. The method of claim 1, wherein:

the frame is substantially rectangular, having a vertical dimension and a horizontal dimension;

steps (i) and (ii) are performed in the horizontal direction in the frame to detect the position of a vertical block boundary; and steps (i) and (ii) are performed in the vertical direction in the frame to detect the position of a horizontal block boundary.

5. The method of claim 1, further comprising the step of:

(vi) if a block is detected, then performing a de-blocking operation based on the detected grid position in the frame.

6. The method of claim 1, wherein in step (i) computing the second derivatives further includes the steps of using a high-pass filter to compute the horizontal and vertical second derivatives.

7. The method of claim 1, wherein: in step (ii) generating the horizontal zero-crossing mask further includes the steps of detecting the sign change point of the horizontal second derivative, and the step of generating the vertical zero-crossing mask further includes the steps of detecting the sign change point of the vertical second derivative.

8. The method of claim 7, wherein:

the frame comprises a rectangle of N×M pixels;

the steps of detecting the sign change points of the second derivatives further including the steps of:

marking a pixel (m, n) as a sign change point of the horizontal second derivative $f_h''$ if $f_h''(m,n) \cdot f_h''(m,n-1) < T$, and marking a pixel (m, n) as a sign change point of the vertical second derivative $f_v''$ if $f_v''(m,n) \cdot f_v''(m-1,n) < T$, wherein $T \leq 0$ is the threshold value; and $0 \leq m < M$ and $0 \leq n < N$.

9. The method of claim 8, wherein T=0.

10. The method of claim 1, wherein:

the frame comprises a rectangle of N×M pixels;

in step (iii) computing the horizontal projected one dimensional signal further includes the steps of computing the horizontal integral projection $P_h(n)$ of the horizontal zero-crossing mask $Z_h(m,n)$ as $$P_h(n) = \sum_{m=1}^{M} Z_h(m, n),$$

and computing the vertical projected one dimensional signal further includes the steps of computing the vertical integral projection $P_v(m)$ of the vertical zero-crossing mask $Z_v(m,n)$ as $$P_v(m) = \sum_{n=1}^{N} Z_v(m, n),$$

wherein m, n, M and N are the row index, column index, height and width of the frame, respectively, and $0 \leq m < M$ and $0 \leq n < N$.

11. The method of claim 1, wherein:

the frame comprises a rectangle of N×M pixels;

in step (iv) generating the local maximum masks further includes the steps of:

for each $0 \leq n < N$, setting the horizontal local maximum mask $X_h(n)$ to 1 if $P_h(n)$ is the maximum within the interval $[n-r_a, n+r_a]$, and setting $X_h(n)$ to 0 otherwise, and for each $0 \leq m < M$, setting the vertical local maximum mask $X_v(m)$ to 1 if $P_v(m)$ is the maximum within the interval $[m-r_b, m+r_b]$ and setting $X_v(m)$ to 0 otherwise.

12. The method of 11 wherein $r_a = a-1$ and $r_b = b-1$ for a grid comprising a block of a×b pixels.

13. The method of claim 1, wherein:

the frame comprises a rectangle of N×M pixels;

in step (v) determining a horizontal grid block boundary position further includes the steps of determining the horizontal position of the grid by computing the horizontal shift $\tau_h$ of the horizontal position $X_h(n)$ of the detected grid from the horizontal position of a standard grid; and determining a vertical grid block boundary position further includes the steps of determining the vertical shift $\tau_v$ of the vertical position $X_v(m)$ of the detected grid from the position of the standard grid, wherein $0 \leq m < M$ and $0 \leq n < N$.

14. The method of claim 13, wherein computing the horizontal shift $\tau_h$ further includes the steps of:

computing the distances $d_h$ between the horizontal local maximum mask $X_h(n)$ and the b possible shifted versions of the horizontal position of the standard grid $S_h(n)$, wherein $$d_h(i) = \sum_{n=0}^{N} |X_h(n) - S_h(n-i)|,$$

where the grid comprises a block of b×a pixels, and i=0, 1, . . . , b−1; and;

finding the smallest value $d_h(i_0)$ among all $d_h(i)$;

setting the horizontal shift $\tau_h = i_0$ if $d_h(i_0) < p \cdot N/b$, where p is a percentage threshold value which is used to determine whether a grid exists, and N is the frame width; and setting $\tau_h=-1$ to indicate no grid is detected if $d_h(i_0) \geq p \cdot N/b$.

15. The method of claim 13, wherein computing the vertical shift $\tau_v$ further includes the steps of:
   computing the distances between the vertical local maximum mask $X_v(m)$ and the b possible shifted versions of the vertical position of the standard grid $S_v(m)$, wherein $$d_v(i) = \sum_{m=0}^{M} |X_v(m) - S_v(m-i)|,$$

where the grid comprises a block of a×b pixels, and i=0, 1, . . . , b−1 and i=0, 1, . . . , b−1;
   finding the smallest value $d_v(i_0)$ among all $d_v(i)$;
   setting the vertical shift $\tau_v=i_0$ if $d_v(i_0)<p \cdot M/b$, where p is a percentage threshold value which is used to determine whether a grid exists, and M is the frame height; and
   setting $\tau_v=-1$ to indicate no grid is detected if $d_v(i_0) \geq p \cdot M/b$.

16. A grid detector system for processing video signals representing video image frames comprising pixels, to detect the existence and the positions of a block grid in each frame resulting from block-based transform coding, wherein the video signal value is a function f of pixel positions in each frame, comprising:
   (a) a mask generator that determines the second derivative f" of the function f at pixel positions for a set of pixels in a the frame, wherein the second derivative f" indicates a change in the relative value of neighboring pixels, and determines the zero-crossings of the second derivative and generates a second derivative zero-crossing mask;
   (b) an integral projector that computes an integral projection of the zero-crossing mask to generate a projected one dimensional signal;
   (c) a local maximum identifier that determines the local maximum for the projected one dimensional signal, and generates a corresponding local mask; and
   (d) a position detector that determines the grid block boundary position by computing the location of the local maximum mask in the frame.

17. The system of claim 16, wherein:
   the mask generator comprises: (i) a horizontal-mask generator that computes a horizontal second derivative $f_h''$ for the function f at multiple pixel positions in the frame and determines the zero-crossings of the horizontal second derivative to generate a horizontal second derivative zero-crossing mask, and a (ii) a vertical-mask generator that computes a vertical second derivative $f_v''$ for the function f at multiple pixel positions in the frame and determines the zero-crossings of the vertical second derivative to generate a vertical second derivative zero-crossing mask;
   the integral projector comprises: (i) a horizontal integral projector that computes a horizontal integral projection of the horizontal zero-crossing mask to generate a horizontal projected one dimensional signal, and (ii) a vertical integral projector that computes a vertical integral projection of the vertical zero-crossing mask to generate a vertical projected one dimensional signal;
   the local maximum identifier comprises: (i) a horizontal local maximum identifier that generates a local maximum mask for the horizontal projected one dimensional signal, and (ii) a vertical local maximum identifier that generates a local maximum mask for the vertical projected one dimensional signal;
   wherein the position detector determines the grid block boundary position by computing the locations of the local maximum masks in the frame.

18. The system of claim 17, wherein:
   the horizontal mask generator comprises a high-pass filter to compute the horizontal second derivative; and
   the vertical mask generator comprises a high-pass filter to compute the vertical second derivative.

19. The system of claim 17, wherein:
   the horizontal mask generator generates the horizontal zero-crossing mask by detecting the sign change point of the horizontal second derivative, and
   the horizontal mask generator generates the vertical zero-crossing mask detecting the sign change point of the vertical second derivative.

20. The system of claim 19, wherein:
   the frame comprises a rectangle of N×M pixels;
   the horizontal mask generator detects the sign change points of the horizontal second derivative by marking a pixel (m,n) as a sign change point of the horizontal second derivative $f_h''$ if $f_h''(m,n) \cdot f_h''(m,n-1)<T$, and
   the vertical mask generator detects the sign change points of the vertical second derivative by marking a pixel (m,n) as a sign change point of the vertical second derivative $f_v''$ if $f_v''(m,n) \cdot f_v''(m-1,n)<T$,
   wherein $T \leq 0$ is the threshold value; and $0 \leq m < M$ and $0 \leq n < N$.

21. The system of claim 20, wherein T=0.

22. The system of claim 17, wherein:
   the frame comprises a rectangle of N×M pixels;
   the horizontal integral projector computes the horizontal projected one dimensional signal by computing the horizontal integral projection $P_h(n)$ of the horizontal zero-crossing mask $Z_h(m,n)$ as $$P_h(n) \sum_{m=1}^{M} Z_h(m, n),$$

and
   the vertical integral projector computes the vertical projected one dimensional signal by computing the vertical integral projection $P_v(m)$ of the vertical zero-crossing mask as $Z_v(m,n)$ as $$P_v(m) = \sum_{n=1}^{N} Z_v(m, n),$$

wherein m, n, M and N are the row index, column index, height and width of the frame, respectively, and $0 \leq m < M$ and $0 \leq n < N$.

23. The system of claim 17, wherein:
   the frame comprises a rectangle of N×M pixels;
   the horizontal local maximum identifier generates the horizontal local maximum mask by, for each $0 \leq n < N$, setting the horizontal local maximum mask $X_h(n)$ to 1 if $P_h(n)$ is the maximum within the interval $[n-r_a, n+r_a]$, and setting $X_h(n)$ to 0 otherwise, and the vertical local maximum identifier generates the vertical local maximum mask by, for each $0 \leq m < M$, setting the vertical local maximum mask $X_v(m)$ to 1 if $P_v(m)$ is the maximum within the interval $[m-r_b, m+r_b]$ and setting $X_v(m)$ to 0 otherwise.

24. The system of 23 wherein $r_a = a-1$ and $r_b = b-1$ for a grid comprising a block of a×b pixels.

25. The system of claim 17, wherein:

the frame comprises a rectangle of N×M pixels;

the position detector determines a horizontal grid block boundary position by determining the horizontal position of the grid by computing the horizontal shift $\tau_h$ of the horizontal position $X_h(n)$ of the detected grid from the horizontal position of the standard grid; and the position detector determines a vertical grid block boundary position by determining the vertical shift $\tau_v$ of the vertical position $X_v(m)$ of the detected grid from the position of the standard grid, wherein $0 \leq m < M$ and $0 \leq n < N$.

26. The system of claim 25, wherein the position detector further computes the horizontal shift $\tau_h$ by:

computing the distances $d_h$ between the horizontal local maximum mask $X_h(n)$ and the b possible shifted versions of the horizontal position of the standard grid $S_h(n)$, wherein $$d_h(i) = \sum_{n=0}^{N} |X_h(n) - S_h(n-i)|,$$

where the grid comprises a block of b×a pixels, and i=0, 1, ..., b−1; and;

finding the smallest value $d_h(i_0)$ among all $d_h(i)$;

setting the horizontal shift $\tau_h = i_0$ if $d_h(i_0) < p \cdot N/b$, where p is a percentage threshold value which is used to determine whether a grid exists, and N is the frame width; and setting $\tau_h = -1$ to indicate no grid is detected if $d_h(i_0) \geq p \cdot N/b$.

27. The system of claim 25, wherein the position detector further computes the vertical shift $\tau_v$ by:

computing the distances between the vertical local maximum mask $X_v(m)$ and the b possible shifted versions of the vertical position of the standard grid $S_v(m)$, wherein $$d_v(i) = \sum_{m=0}^{M} |X_v(m) - S_v(m-i)|,$$

where the grid comprises a block of a×b pixels, and i=0, 1, ..., b−1 and i=0, 1, ..., b−1;

finding the smallest value $d_v(i_0)$ among all $d_v(i)$;

setting the vertical shift $\tau_v = i_0$ if $d_v(i_0) < p \cdot M/b$, where p is a percentage threshold value which is used to determine whether a grid exists, and M is the frame height; and setting $\tau_v = -1$ to indicate no grid is detected if $d_v(i_0) \geq p \cdot M/b$.

28. The system of claim 16, further comprising a de-blocker, wherein if a block boundary is detected, then the de-blocker performs a de-blocking operation based on the detected grid position in the frame.

* * * * *